US009737895B2

(12) United States Patent
Genereux et al.

(10) Patent No.: US 9,737,895 B2
(45) Date of Patent: Aug. 22, 2017

(54) PERSONAL RECHARGEABLE PORTABLE IONIC AIR PURIFIER

(71) Applicant: HEADWATERS, INC, Marblehead, MA (US)

(72) Inventors: Philippe J. Genereux, Ottawa (CA); Rudy A. Vandenbelt, Ottawa (CA); Troy G. Anderson, Marblehead, MA (US)

(73) Assignee: Headwaters Inc, Marblehead, MA (US)

(*) Notice: Subject to any disclaimer, the term of this patent is extended or adjusted under 35 U.S.C. 154(b) by 0 days.

(21) Appl. No.: 14/732,755

(22) Filed: Jun. 7, 2015

(65) Prior Publication Data

US 2015/0352564 A1 Dec. 10, 2015

Related U.S. Application Data

(60) Provisional application No. 62/009,262, filed on Jun. 8, 2014.

(51) Int. Cl.

| | |
|---|---|
| ***B01D 53/32*** | (2006.01) |
| ***B03C 3/08*** | (2006.01) |
| ***B03C 3/12*** | (2006.01) |
| ***B03C 3/32*** | (2006.01) |
| ***H01T 23/00*** | (2006.01) |
| ***B03C 3/41*** | (2006.01) |
| ***B03C 3/02*** | (2006.01) |
| ***B03C 3/38*** | (2006.01) |

(52) U.S. Cl.
CPC .................. *B03C 3/41* (2013.01); *B03C 3/02* (2013.01); *B03C 3/32* (2013.01); *B03C 3/38* (2013.01); *H01T 23/00* (2013.01)

(58) Field of Classification Search
CPC ........ B01D 53/32; B01D 53/323; B03C 3/08; B03C 3/12; B03C 3/32; B03C 3/743; C01B 13/115; H01T 23/00; Y10T 428/24322
USPC ..... 96/28, 51, 16, 55, 77, 82, 87, 96; 55/55, 55/DIG. 35, 385.1; 422/186.04, 186
See application file for complete search history.

(56) References Cited

U.S. PATENT DOCUMENTS 5,165,395 A * 11/1992 Ricci .................. A41D 13/1146 128/202.22
6,919,053 B2 * 7/2005 Joannou .................... B03C 3/12 422/186

(Continued)

FOREIGN PATENT DOCUMENTS

CN 203280928 U 11/2013

*Primary Examiner* — Jacob T Minskey
*Assistant Examiner* — Minh-Chau Pham
(74) *Attorney, Agent, or Firm* — Albert Peter Durigon

(57) ABSTRACT

A portable rechargeable personal ionic air purifier energizing a personal airspace and cleaning particulate pollutants therefrom in a manner that poses little or no personal shock risk and that minimizes battery drain to maximize battery life includes ionization means and ionization actuation means cooperative to provide ion bursts at regular intervals to energize and to clean particulates from the personal airspace. The ionization means includes an ion emitter and the ionization activation means includes means for providing a pulse train of predetermined frequency and duty cycle. The ion emitter may be removably mounted to a portable housing and/or to a facemask or other objects in the personal airspace via an elongated flexible cable.

18 Claims, 11 Drawing Sheets

(56) References Cited

U.S. PATENT DOCUMENTS

| | | | | |
|---|---|---|---|---|
| 7,215,526 | B2 * | 5/2007 | Constantinos .......... | H01T 23/00 361/230 |
| 7,404,935 | B2 * | 7/2008 | Lau ........................ | B01D 53/32 422/186.04 |
| RE41,812 | E * | 10/2010 | Taylor .................... | B01D 53/32 422/186 |
| 2003/0147784 | A1 | 8/2003 | Joannou | |
| 2006/0268490 | A1 | 11/2006 | Joannou | |
| 2007/0266855 | A1 * | 11/2007 | Fleisher .................. | B03C 3/155 96/16 |
| 2008/0078295 | A1 * | 4/2008 | Leng ......................... | B03C 3/08 96/77 |
| 2015/0174587 | A1 * | 6/2015 | Wei ........................... | B03C 3/12 422/186.04 |
| 2015/0266031 | A1 * | 9/2015 | Mills ....................... | B03C 3/017 95/71 |

* cited by examiner

PERSONAL RECHARGEABLE PORTABLE IONIC AIR PURIFIER

CROSS-REFERENCE TO RELATED INVENTIONS

This application is related to Joannou, U.S. Pat. No. 7,215,526, entitled Ion Generator with Open Emitter and Safety Feature, issued May 8, 2007, and to Joannou, U.S. Pat. No. 6,919,053, issued Jul. 19, 2005, entitled Portable Ion Generator and Dust Collector, each incorporated herein by reference.

FIELD OF THE INVENTION

The present invention relates to ion generators, and more particularly, to battery-operated portable ion generators for personal use and for air purification.

BACKGROUND OF THE INVENTION

Portable ionic air purifiers are called upon to controllably provide ions to energize and to clean a polluted personal airspace such as that of a taxicab or airplane cabin or other environ of viruses, pollen, smoke, mold, dust mites, and other particulate pollutants while posing little or no personal shock risk, and among other things to exhibit a long battery life and to be manufacturable at low cost. The heretofore known portable ionic air purifiers, such as the aforesaid patents to Joannou, U.S. Pat. No. 7,215,526, Ion Generator with Open Emitter and Safety Feature, and U.S. Pat. No. 6,919,053, Portable Ion Generator and Dust Collector, however, are disadvantageous in one or more of these or other aspects.

SUMMARY OF THE INVENTION

The personal rechargeable portable ionic air purifier of the present invention controllably provides ions to energize personal airspaces and to clean personal airspaces such as that of a taxicab or airplane cabin or other environ of viruses, pollen, smoke, mold, dust mites, and other particulate pollutants while posing little or no personal shock risk to users or others in the environ, operates a long time between recharges and among other advantageous aspects is manufacturable at low cost.

An object of the present invention is to provide a pulse and power management means for a portable, rechargeable, personal ionic air purifier for providing a means to control pulse timing and pulse intensity in a portable battery operated ionic emissions device that will allow for maximum control of power consumption.

Another object of the present invention is to provide for the mitigation of shocks to the user by means of pulse duty cycle management techniques.

Another object of the present invention is to provide precise management of pulse timing and thus provide maximal comfort to the user by precisely controlling the pulse "ON" time and thus directly reducing secondary static shocks to the user.

Another object of the present invention is to maximize performance and especially to provide the maximum ion output for the air purifier.

Another object of the present invention is to provide minimal overall power consumption of the air purifier thus extending use time and battery life.

Further objects of the present invention are to provide portable rechargeable personal ionic air purifiers with a replaceable ion emitter, a replaceable ion emitter on an elongated conductive cord and an ion emitter on a conductive elongated cord adapted for use with an auxiliary device such as a face filter mask.

Additional objects of the present invention are to provide ion emitter protection means to prevent its damage from handling and storage when the personal air purifier is not in active use, to provide presentation aspect change means to coordinate the visual aspect the air purifier makes to accommodate any desired mood and look, to provide lanyard releasable attachment and electrical connection means to exchange one lanyard for another lanyard when it becomes soiled, to change to a different length, to change to another comfort or finish level or other reason to change one lanyard for another, and to provide ion boost means to temporarily increase and or decrease ion generation in exceptional situations when desired to provide temporarily increased and or decreased removal of particulate pollutants and/or temporarily enhanced and or reduced ionic energization levels.

In accord with these and other objects and advantageous features and inventive aspects, the portable battery powered personal ionic air purifier energizing a personal air space with ions and cleaning particulate pollutants therefrom that poses little or no personal shock risk and that minimizes battery drain to maximize battery life and useful operating lifetime of the present invention includes ionization actuation means for providing a pulse train of predetermined frequency and duty cycle and ionization means including an ion emitter responsive to said pulse train of predetermined duty cycle and frequency for controllably energizing said ion emitter to provide ion bursts of controlled burst length at controlled intervals such that said burst length is controlled by said duty cycle of said pulse train and said interval is controlled by said frequency of said pulse train; wherein said predetermined duty cycle of said pulse train is determined to have a comparatively-short on time and comparatively-long off time, in order to minimize if not prevent shock hazard and to minimize battery drain; and wherein said predetermined pulse frequency of said pulse train is determined to so refresh the air space with another burst of ions as to maintain an energizing and particulate-removing ion cloud in the personal airspace that otherwise would dissipate over time.

In different disclosed embodiments, the pulse train providing means may include a digital timer circuit, an a-stable analog oscillator or a dedicated controller. The ion emitter of said ionization means such as a carbon brush emitter may be fixedly or removably mounted to a portable compact housing, facemask or other object in the personal airspace to be cleaned by and energized with ions directly and or via an elongated flexible conductor to which it may be attached.

Grounding means are disclosed that in different embodiments include an adjustable, break-away conductive lanyard or conductive ground plate among other ways of creating a potential difference sufficient to attract and draw ions away from the ion emitter of the ionization means.

Ion emitter protection means are disclosed to prevent damage from air purifier handling and storage when not in active use that include in different embodiments a mechanism for covering the ion emitter and a mechanism for protectively retracting it when not in use.

Presentation aspect change means are disclosed to coordinate the visual aspect the air purifier presents to suit a desired mood and look that in one presently preferred embodiment includes interchangeable elements that present to view faces of selectively different color, pattern, texture, or material among other aspects each designed to suit another desired mood and look.

Lanyard releasable attachment and electrical connection means are disclosed to exchange one lanyard for another lanyard when soiled, of different length, another comfort level or other reason to change one lanyard for another that in one presently preferred embodiment includes a lanyard provided with male plug ends and a housing provided with grounded female plug terminals.

Ion boost means are disclosed to temporarily increase and/or decrease ion generation in exceptional situations when desired to provide temporarily increased and/or reduced removal of particulate pollutants and/or temporarily enhanced and/or diminished ionic energization levels.

BRIEF DESCRIPTION OF THE DRAWINGS

These and other objects, advantages features and inventive aspects of the present invention will become apparent as the invention becomes better understood by reference to the following detailed description of the presently preferred embodiments thereof, and to the drawings, wherein.

DETAILED DESCRIPTION OF THE PRESENTLY PREFERRED EMBODIMENTS

Figure 1A:
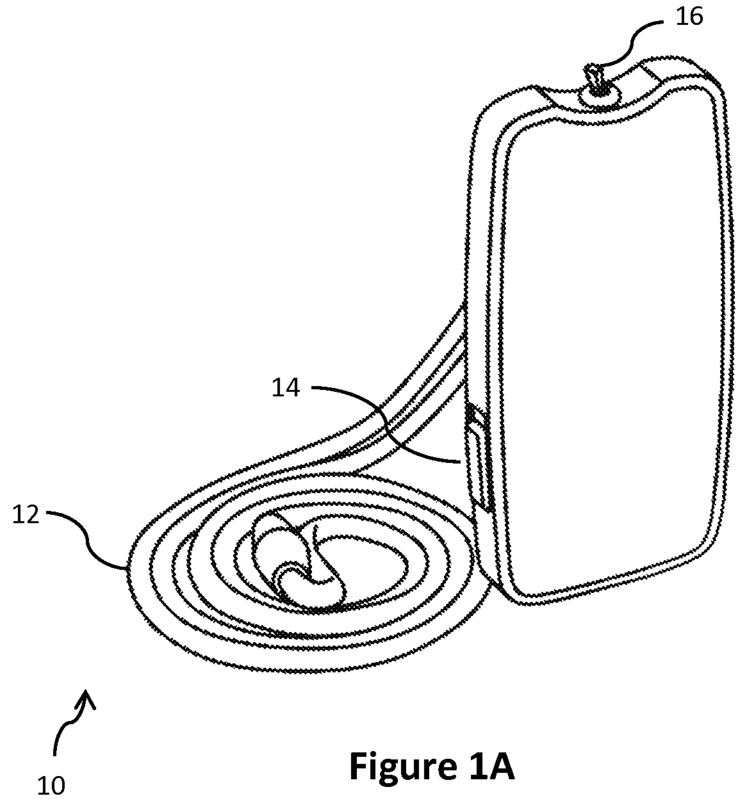
FIG. 1 in the FIGS. 1A, 1B thereof are pictorial views of a portable rechargeable personal ionic air purifier in accord with the present invention.

It is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

Figure 1B:
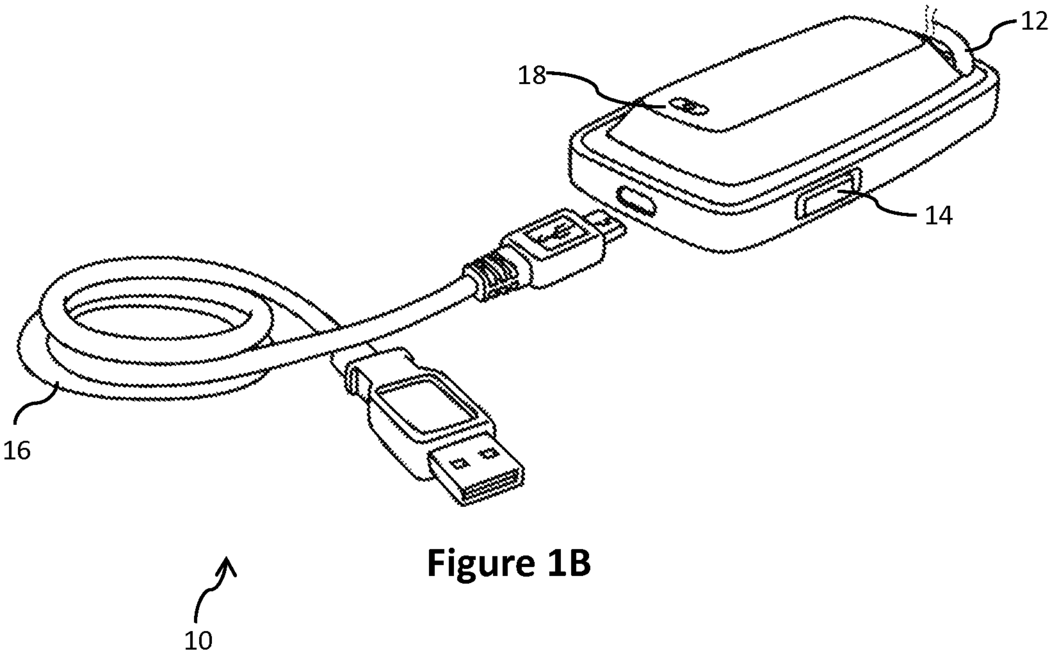

Turning now descriptively to the drawings, FIG. 1 in the FIGS. 1A, B thereof illustrates generally at 10 the portable, rechargeable, personal ionic air purifier 10 of the present invention. The user hangs the purifier 10 around their neck using the conductive cord or lanyard 12 and turns it "on" using the switch 14. A cloud of ions, not shown, is thereby produced off of carbon brush 16 or other ion emitter directed towards the facial area, not shown, to energize the personal airspace with ions and remove particulates therefrom. These ions attract opposite charged particles in the air and are then attracted together towards the nearest ground source. The conductive cord 12 ensures that the ground source is the body of the user and not the breathable air stream, thus effectively cleaning the breathable air stream of contaminants in the air and/or producing negative ions. A USB cable 16 (FIG. 1B) may be used to recharge its internal battery. An LED 18 provides a signal indication of charge and/or use status of the purifier 10.

The purifier cleans the air, typically about a three-foot sphere about the head when the purifier is worn about the neck using the lanyard, of viruses, pollen, smoke, mold, dust mites and other particulate-pollutants. The purifier can also be placed, for example, on a night stand, so that the air around the pillow area is purified of pollutants, or located nearby on a table, seat or anywhere else energization by negative ions and/or purification may be desired or necessary.

It is known from U.S. Pat. No. 6,919,053 that a grounded surface in proximity of a high voltage ion source increases the production of ions. Ideally an electrical connection is formed between the ground terminal of the high voltage source and the surface in question. In the case of a personal air purifier, this connection is achieved through a conductive fabric lanyard which is in contact with the user's skin. The fabric is ideally composed of ordinary fabric with conductive elements interweaved. The conductive elements produce an electrical connection between the user and one side of the high voltage power circuit output to be described. The conductivity of the fabric can be achieved using a multitude of methods, some of which will desirably provide a more comfortable user experience than others.

The conductive grounding neck strap allows for the device to use the body of the person wearing the purifier as a ground source. This has the effect of providing a large ground plane and a significant increase in ion output from the purifier. The strap is generally of cotton construction with interwoven layers of conductive materials. It is connected directly to the floating ground in the device and concurrently to the individual user while hanging around the neck and/or in contact with bare skin.

The ground cord may be constructed of any type of conductive materials. A ground plate in contact with the body of the user can substitute for the cord if required. Other grounding means may be employed.

Figure 2:
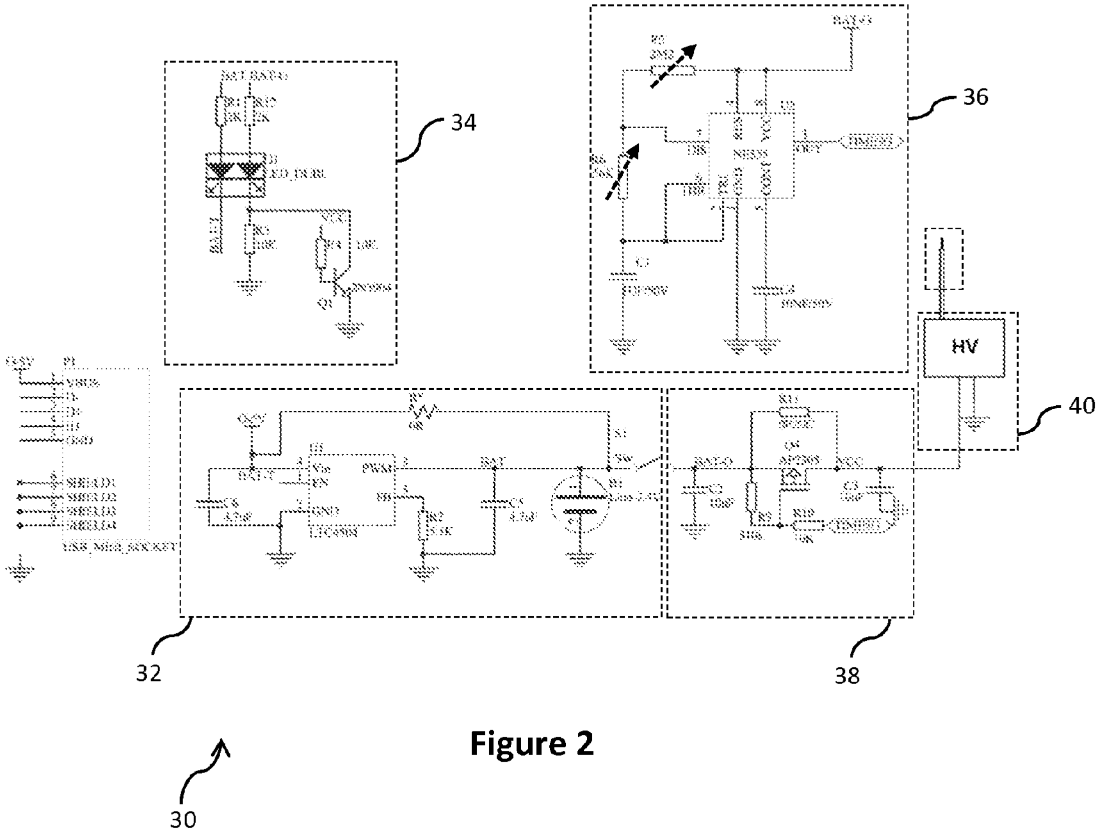
FIG. 2 is a schematic block diagram of the electrical circuitry thereof.

Referring now to FIG. 2, generally designated as 30 is a schematic block diagram of the electrical circuitry of the portable rechargeable personal ionic air purifier of the present invention.

As shown, a battery management circuit illustrated by dashed box 32 is operatively coupled to an indicator circuit illustrated by dashed box 34, a timer circuit illustrated by dashed box 36 and a current amplifier circuit illustrated by dashed box 38. The timer circuit 36 is connected to the current amplifier 38 and a high voltage power circuit illustrated by dashed box 40 is connected to the current amplifier 38.

The battery management circuit 32, which includes a rechargeable battery with a charge controller IC, is an energy source which is capable of managing the energy flow in and out of the device. The battery cell stores energy while the charge controller IC of the battery management circuit 32 manages the energy in and out of the cell. When a voltage is applied to the circuit to charge the battery, the charge controller IC determines whether the battery can accept additional energy or not. If the device is in a position to draw too much energy from the battery cell, the charge management IC will also prevent excess discharge of the battery. This combination of devices results in a safer product while allowing longer battery life by preventing damage to the cell.

The battery management circuit 32 of the purifier employs a lithium polymer power source with IC based charge and discharge management.

Non-rechargeable battery sources may be used for operation of this purifier.

The indicator circuit 34 preferably includes a charge indicator, when the air purifier is connected to the USB charger, and a cleaning indicator, when negative ions are being produced.

Each pulse of the output train of timing pulses of the timer circuit 36 saturates the transistor Q4 of the switching circuit and current amplifier 38. An amplified switching signal is applied thereby to the high-voltage circuit 40. The battery source provides power to the timer circuit 36 and the power transistor Q4. The timer circuit provides a time on pulse to the transistor thus directing low voltage power to the high-voltage power supply circuit 40. The output of the high-voltage circuit is connected to the ground strap on one side and the ion emitter on the other. By supplying high voltage pulses to the conductive ion emitter, the emitter will provide a pulse of ions. The ground of lanyard 12 attached to the user's body simply enhances the potential difference between the body and the ionizer thus promoting better ion output and distribution.

Figure 3A:
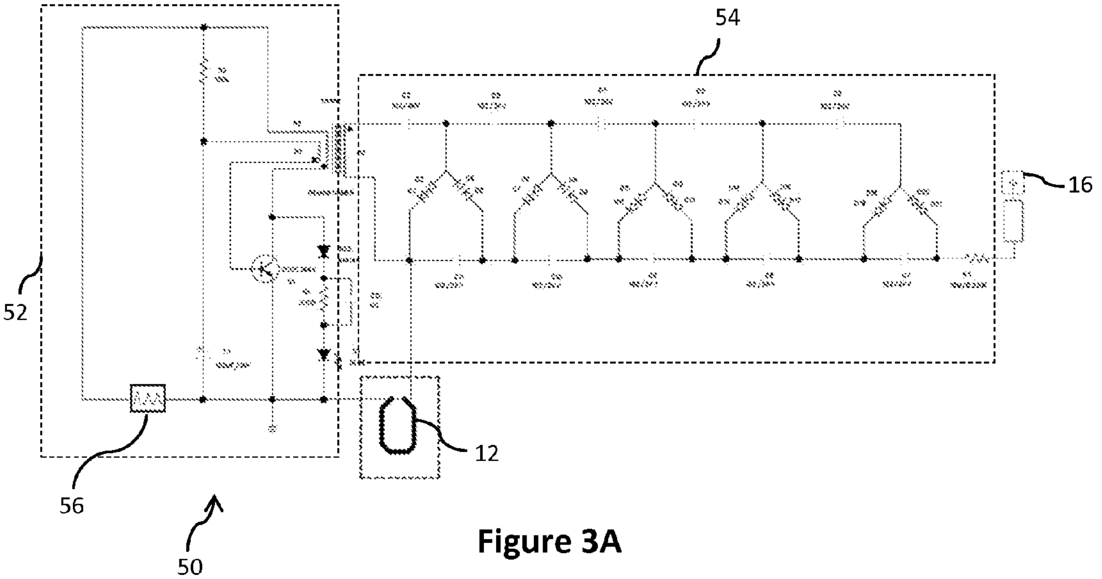
FIG. 3 in the FIGS. 3A, 3B thereof are schematic block diagrams illustrating the high voltage power circuit of portable rechargeable personal ionic air purifier of present invention with Villiard-style voltage multiplier circuit and high voltage output.

Referring now to FIG. 3A, generally designated 50 is a schematic block diagram illustrating the high voltage power circuit of the portable rechargeable personal ionic air purifier of the present invention. The high voltage power circuit 50 accepts a low voltage input and extends a high voltage of four (4) kV to sixteen (16) kV on the output. It generally consists of a DC to AC converter illustrated by dashed box 52 that is connected to AC to DC converter designated by dashed box 54. The DC to AC converter 52 of the high-voltage power circuit 50 includes a step-up transformer, as shown, that receives the amplified switching signal schematically illustrated by box 56 of the switching circuit and current amplifier 38 (FIG. 2) and converts its DC pulses to AC. The transformer, and a Villiard-style capacitor-diode voltage multiplier, as shown, of the AC to DC capacitor ladder network 54, convert the AC signal to high-voltage DC at ionization potential which, as shown, is applied to ion emitter 16.

Details on control parameters for the frequency and duty cycle are as follows (referring to components in the timing circuit of FIG. 2).

$$\text{Frequency of pulse}=(1.44)/((R5+2*R6)*C).$$

The frequency is a function of R5, R6 and the capacitor C.

$$\text{Duty cycle}=R6/(R5+2*R6).$$

The duty cycle is related to the ratio of the two resistors R5 and R6.

For these presently preferred and exemplary values a frequency of approximately 0.6 Hz and a duty cycle of two and one half (2.5) % for the timer is obtained.

There is some time required for the capacitor connected to the high voltage power supply to charge up so the actual output pulse from the high voltage power supply is shorter (capacitor C3 in the switching circuit).

R5=two and two tenths (2.2) MOhms, R6=fifty-six (56) kOhm, C=one (1) microFarad.

Pulse period=one and six tenths (1.6) seconds.

ON pulse length (T(on))=0.04 s (40 ms).

The length of the pulse is just long enough to charge up the capacitors in the high voltage supply to produce a burst of ions.

Figure 3B:
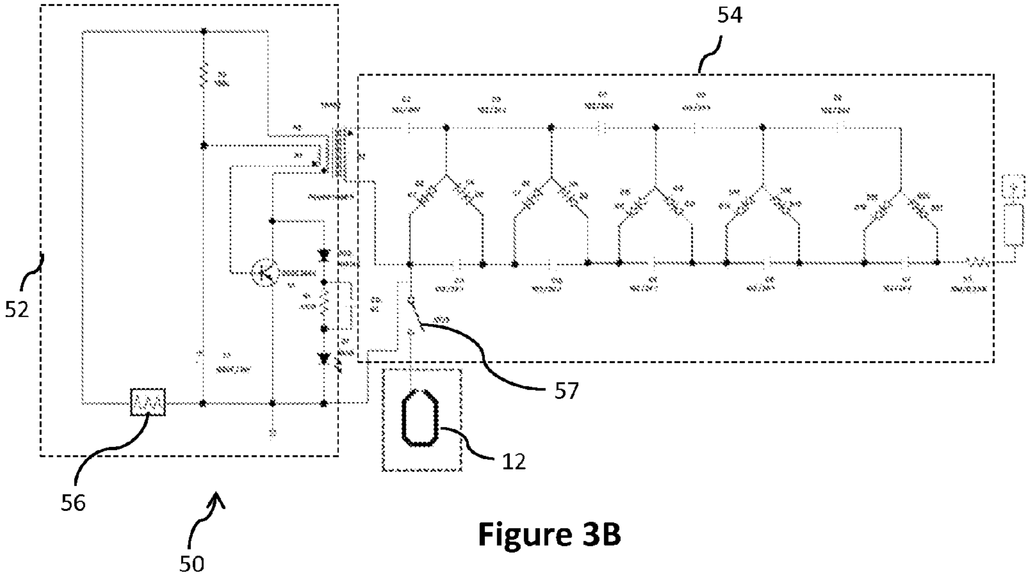
Figure 4:
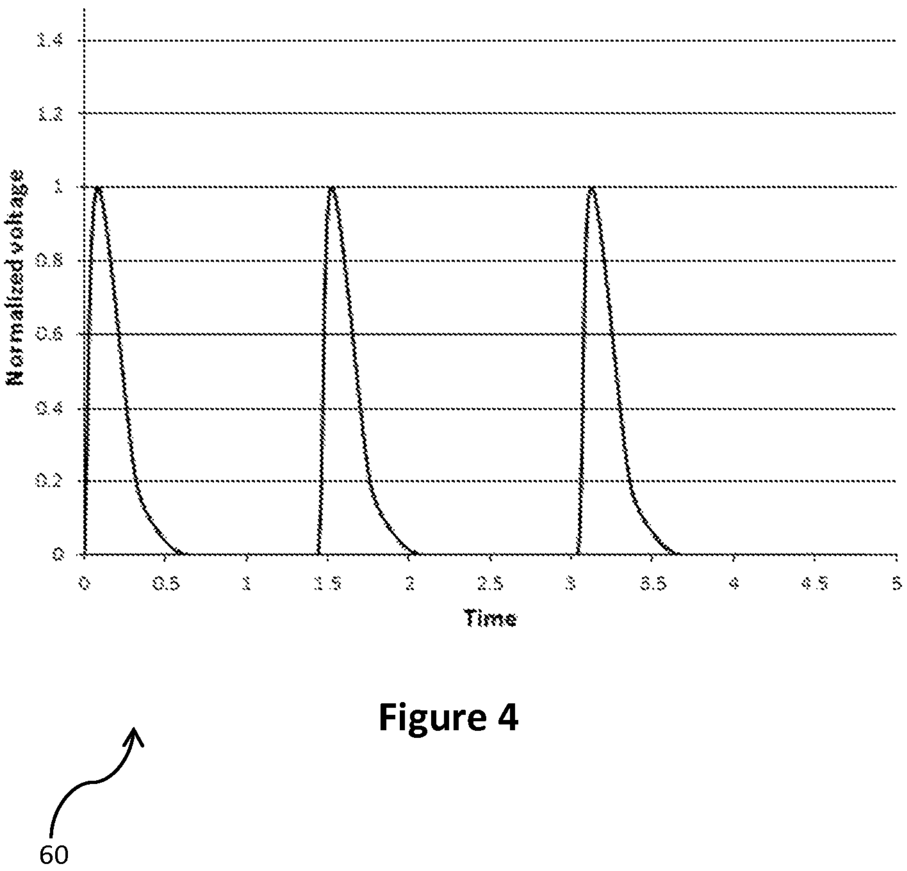
FIG. 4 is a graph that illustrates the voltage at the emitter brush characterized by minimal peak dwell time of the portable rechargeable personal ionic air purifier of the present invention.

FIG. 4 shows generally at 60 the short ON time (T(on)) of the output signal of the high-voltage power circuit 50 (FIG. 3). Short ON time or high voltage pulse length is desirable to produce high concentrations of ions while minimizing the shocks experienced by the user due to excess charge produced by the ionizer. Minimizing the ON time also reduces battery consumption by reducing the amount of power that the high voltage power supply consumes. We found that the analog timer circuits from the hereinabove incorporated prior art to Joannou produced long ON pulses resulting in reduced battery life due to wasted energy as well as discomfort to the user due to shocks. Precise control of the duty cycle and frequency are required to mitigate these problems. In practice, an ON pulse of less than fifty (50) ms is desired for comfort. A frequency of at least 0.4 Hz is desirable for good performance and maintenance of a sufficient ion cloud in the personal airspace that otherwise naturally would dissipate over time.

With initiation of the ON pulse the voltage of the ion emitter rises quickly to reach DC ionization potential. Ion emission continues for the duration of the ON pulse. At the end of the ON pulse, the voltage of the ion emitter declines as the source voltage no longer replenishes the energy in the high-voltage power supply. Ion emission and emitter voltage decay exponentially after the expiration of the ON pulse. A quiet interval of substantially no ion emission exists until the beginning of the next ON pulse.

To allow comfort for the user and maximize battery life, high voltage ion emission from the emitter should be performed in short bursts or pulses. Control over the pulse length and pulse frequency are of great importance. Generally it is preferential to minimize T(on) per FIG. 4. By managing the T(on) variable one can then maximize the comfort of the individual wearing the device (fewer shocks) while at the same time significantly increasing battery life. There are many methods which may be used to control the timing and duty cycle of the high voltage pulses. Optimum results can be achieved using a timer IC such as a "555" timer. The accurate timing and length of the pulses allows maximum ion production with minimal discomfort to the user. For the exemplary parameters of the presently preferred embodiment, maximum control can be obtained for the two resistors and one timing capacitor described above. The timing capacitor determines the frequency of the high voltage pulse while the ratio between the two resistors determines the duty cycle or pulse length.

The timer circuit 36 of the FIG. 2 embodiment is a standard IC based “555” timer acting as an a-stable oscillator and which uses a ratio of resistors to manage the output duty cycle. This timer circuit gives very fine control of the T(on) variable at a very low cost. Other type of timer circuits or pulse train generators include a programmable IC, a microcontroller, or a simple a-stable analog oscillator circuit.

As appears more fully below, among other ways to temporarily vary on-demand ion generation, the potential may be increased beyond the ionization potential whenever it is desired to boost ion generation in dirty or other especially polluted environments or to provide a boost of energizing ions but at the expense of an increased shock risk and consumption of battery power. Ionization potential boost control circuitry, not shown, may be employed to temporarily boost as long as desired the ionization potential beyond ionization threshold to temporarily increase ion emission on-demand. In one exemplary and presently preferred embodiment, the ionization potential boost control circuitry may include an input voltage multiplier circuit and switch actuator to vary on-demand the battery voltage from three and seven-tenths (3.7) to five (5) VDC in order to give a twenty-five to thirty percent (25-30%) boost to ionizer voltage.

Other ways to temporarily vary on-demand ion generation include changing the duty cycle and or frequency of the pulse train. A boost switch, not shown, may be employed to vary the resistors R5 and R6 that respectively control the frequency and duty cycle of the pulse train to temporarily vary on-demand ion generation. Increasing the pulse length and/or frequency increases ion emission when air quality is bad or a boost of energizing ions is important; conversely, decreasing the pulse length and/or frequency of the pulse train decreases ion emission whenever air quality is not too bad or it is important to conserve battery power and therewith battery life.

Another way to temporarily decrease ion generation is to disconnect the lanyard from electrical ground. As shown by switch 57 in FIG. 3B, when the lanyard 12 is connected to ground by switch 57, ion generation would be comparatively-high, whereas were the lanyard 12 disconnected from ground by switch 57, ion generation would be comparatively-lower.

Any other suitable means for temporarily varying ion generation on-demand may be employed without departing from the inventive concepts.

Figure 5:
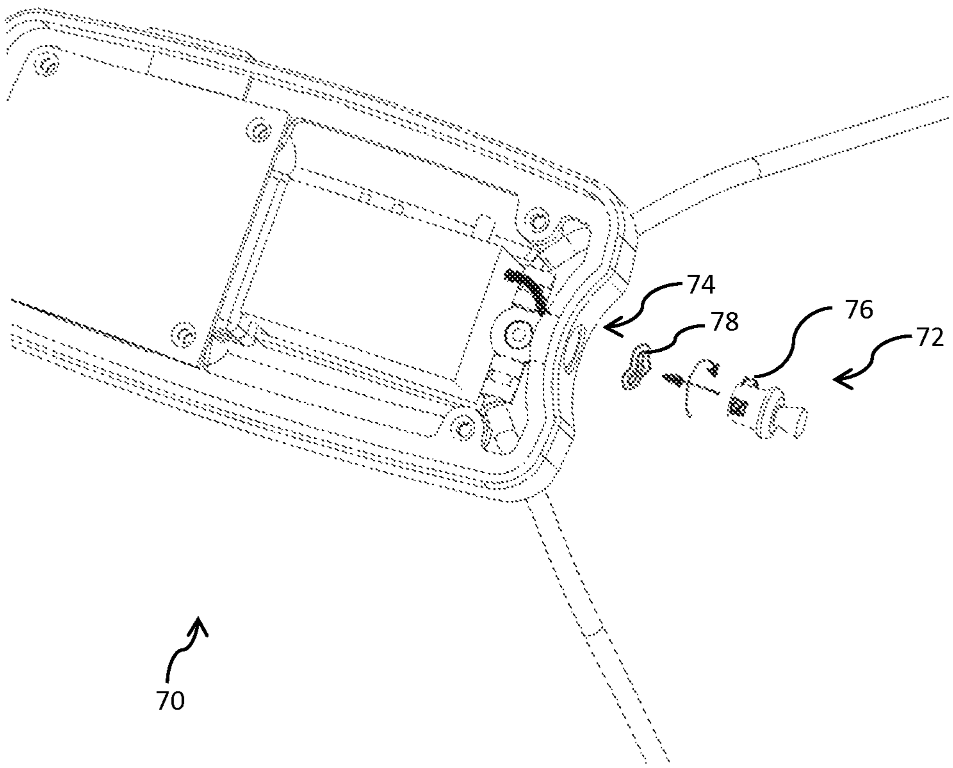
FIG. 5 is a pictorial diagram that illustrates a removable emitter brush of another embodiment of a portable rechargeable personal ionic air purifier in accord with the present invention.

Referring now to FIG. 5, generally designated at 70 is a pictorial diagram that illustrates a removable emitter brush of another embodiment of a portable rechargeable personal ionic air purifier in accord with the present invention. This embodiment of the air purifier includes a plug-in carbon brush emitter generally designated 72 that fits into a socket generally designated 74 provided therefor on the housing of the air purifier. The socket 74 is connected to the high-voltage supply output. A channel, not shown, is provided in the socket 74 that cooperates with lock tabs 76 on the carbon brush emitter 72 and spring 78 to removably retain it in the socket 74. A fiction-fit or other means to provide removability and replaceability of the carbon brush emitter are within the scope of the present invention.

Figure 6:
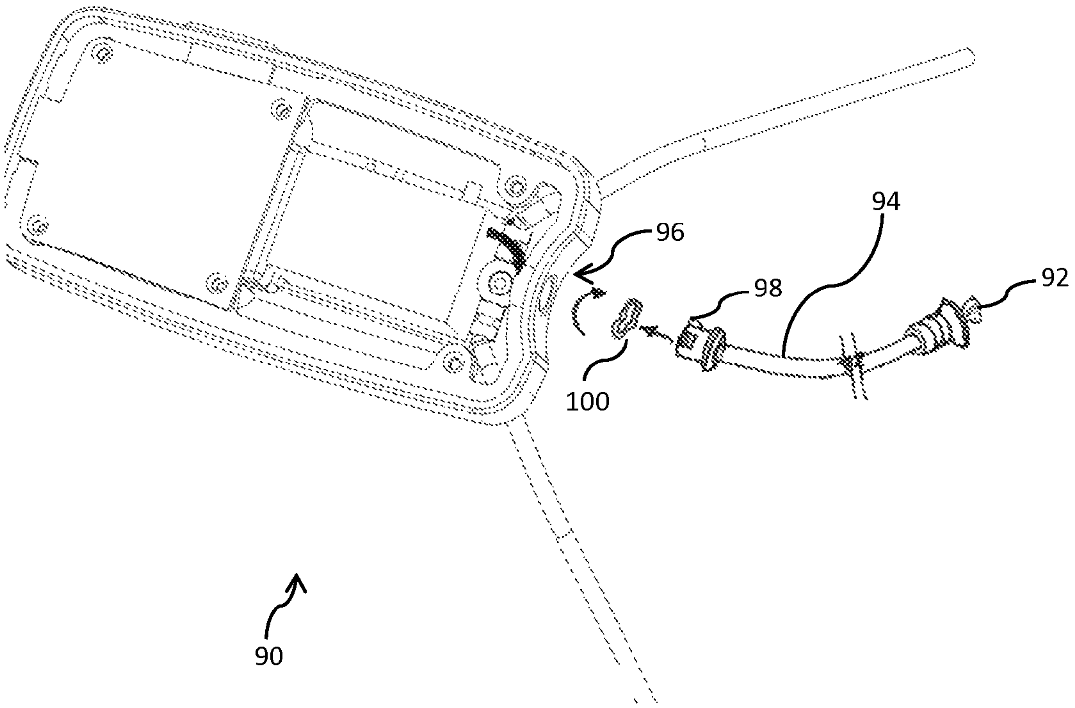
FIG. 6 is a pictorial diagram that illustrates an emitter brush on the remote end of an elongated flexible conductive cord of another embodiment of a portable rechargeable personal ionic air purifier in accord with the present invention.

Referring now to FIG. 6, generally designated at 90 is a pictorial diagram that illustrates an emitter brush on the remote end of an elongated flexible conductive cord of another embodiment of a portable rechargeable personal ionic air purifier in accord with the present invention. The emitter brush 92 is provided on the free end of an elongated flexible conductive cord 94, it’s other end being removably mounted in a socket generally designated 96. A channel, not shown, is provided in the socket 96 that cooperates with lock tabs 98 on the other end of the conductive extension 94 and with spring 100 to removably retain it in the socket 96. A fiction-fit or other means to provide removability and replaceability of the extended carbon brush emitter are within the scope of the present invention. In this manner, the brush emitter 92 may be remotely placed via and within the extension of the elongated flexible conductive cord 94 of the air purifier of the present invention.

Figure 7A:
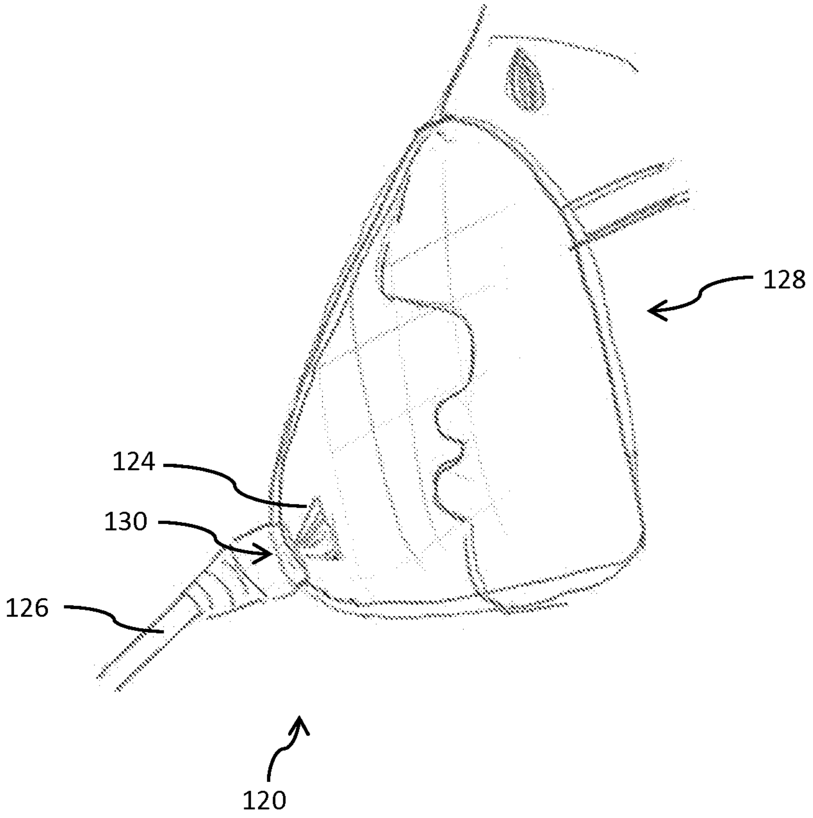
FIG. 7 in the FIGS. 7A, 7B thereof are pictorial views that illustrate the emitter brush on the remote end of an elongated flexible conductive cord seated in a face filter mask of another embodiment of a portable rechargeable personal ionic air purifier in accord with the present invention.
Figure 7B:
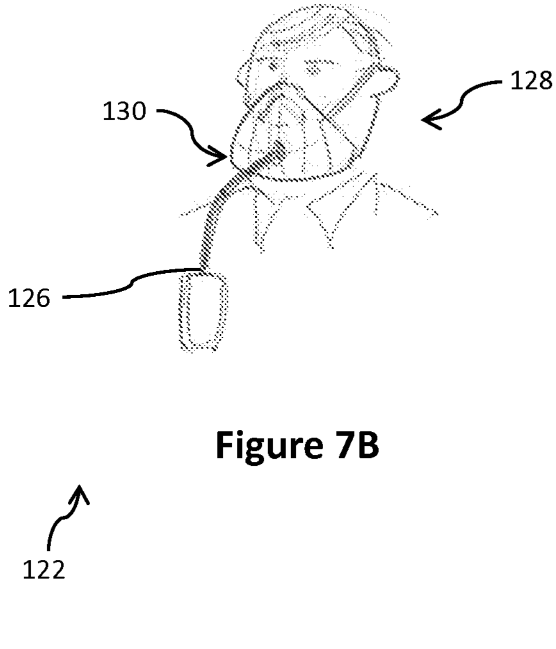

Referring now to FIG. 7, generally designated at 120, 122 in the FIGS. 7A, 7B thereof are pictorial views that illustrate the ion emitter brush on the remote end of an elongated flexible conductive cord seated in a face filter mask of another embodiment of a portable rechargeable personal ionic air purifier in accord with the present invention. The emitter brush 124 on the remote end of an elongated flexible conductive cord 126 is seated in a face filter mask generally designated 128. The filter mask 128 is adapted to be worn about the head and neck of the user, as shown, and includes an opening generally designated 130 thereinthrough adapted to receive and to removably mount the brush emitter 124 to the filter mask 128 in safe position to the respiratory passages. Any suitable receiving and mounting means may be employed in accord with the present invention. Any other auxiliary device other than a filter mask is contemplated, such as a bike/motorbike helmet, or other headgear, a desk lamp or other object in the vicinity, or a lapel or other part of clothing.

Appropriate mounting means in each of these and other auxiliary devices or locations are contemplated.

Typically, the ion emitter is of a brittle carbon fiber or other material that can get damaged when put for example in a purse or backpack. The shorter and the less number of fibers, the fewer the ions produced and the less performance is achieved by such damaged ion emitters.

Figure 8A:
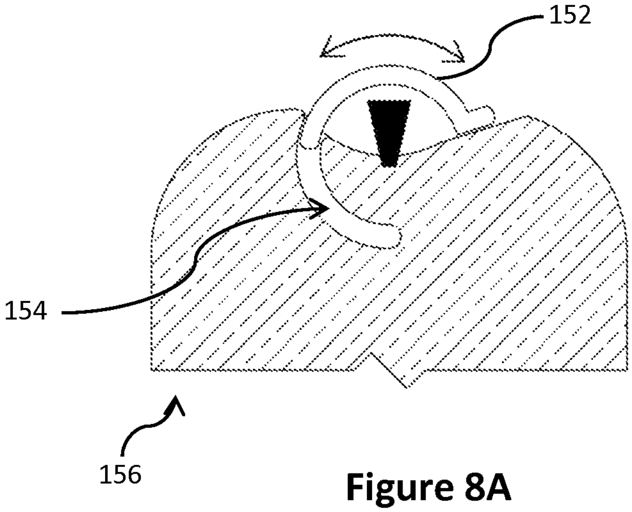
FIG. 8 in the FIGS. 8A, 8B thereof are pictorial views showing one ion emitter protection embodiment and FIG. 9 in the FIGS. 9A, 9B thereof are pictorial views showing another ion emitter protection embodiment of a portable rechargeable personal ionic air purifier in accord with the present invention.
Figure 8B:
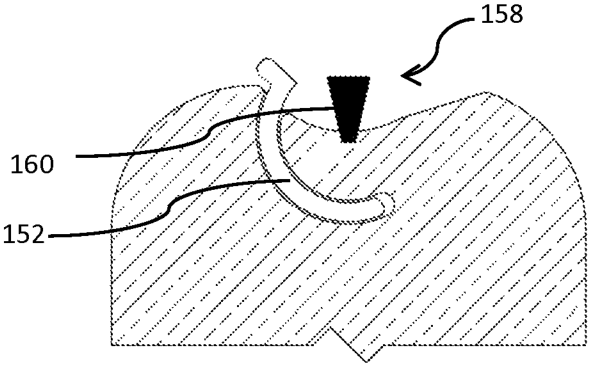

FIG. 8 in the FIGS. 8A, 8B thereof are pictorial views showing one ion emitter protection embodiment of a portable rechargeable personal ionic air purifier in accord with the present invention. A semi-cylindrical cover 152 is mounted in an arcuate groove generally designated 154 for sliding motion between closed and open positions generally designated 156, 158 respectively in the FIGS. 8A, 8B. In its closed position 156, the cover 152 is withdrawn from arcuate groove 154 to cover and protectively enclose the ion emitter 160 in order to prevent its damage from handling and storage when not in active use. A switch, not shown, responsive to the position of the cover 152 may be provided to turn the unit “off” when it is in its closed position 156. In its open position 158, the cover 152 is retracted into the groove 154 and the emitter 160 is unprotected for active use.

Figure 9A:
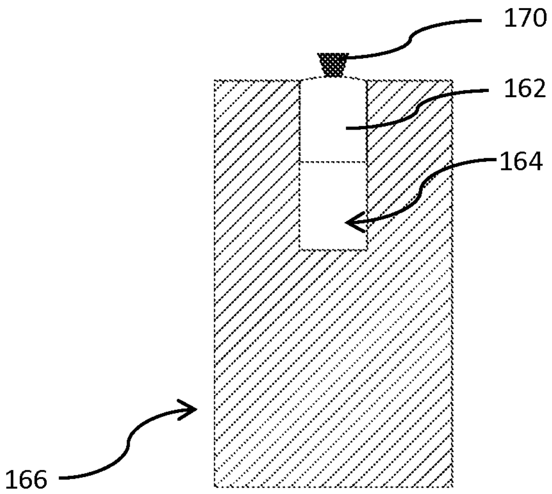
Figure 9B:
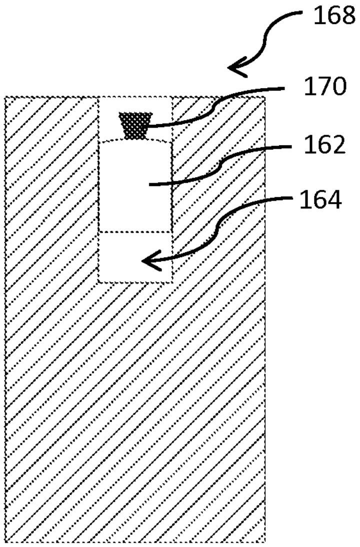

FIG. 9 in the FIGS. 9A, 9B thereof are pictorial views showing another ion emitter protection embodiment of a portable rechargeable personal ionic air purifier in accord with the present invention. A slide 162 is mounted in a channel generally designated 164 for sliding motion between open and closed positions generally designated 166, 168 respectively in the FIGS. 9A, 9B. In its closed position 168, the ion emitter 170 mounted for movement with the slide 162 is wholly recessed within and protectively enclosed by the walls defining the channel 164 to prevent its damage from handling and storage when not in active use. A switch, not shown, responsive to the position of the slide 162 may be provided to turn the unit "off" when it is in its closed position 168. In its open position 166, the emitter 170 is unprotected for active use.

Many cover and slide modifications and any other suitable means for moving the slide may be employed. In the illustrated embodiment, one of the walls defining the channel 164 is provided with an open slot and an arm is provided on the slide 162, both not shown, extending through the open wall of the slot. By manipulation of the extending arm, the slide 162 may be upwardly and downwardly moved between its open and closed positions 166, 168.

Any other suitable means for protecting the ion emitter against damage when not in use may be employed without departing from the inventive concepts.

Portable rechargeable personal ionic air purifiers in accord with the present invention serve as accessories typically worn about the neck and accompany the individual user in each business, casual, pleasure or other situation of its protective and or energizing use. An aim of accompanying accessory use may be to look presentable in the particular situation of use but the personal airspace cleaners heretofore presented a single visual aspect that did not necessarily conform to a desired mood and look.

Figure 10:
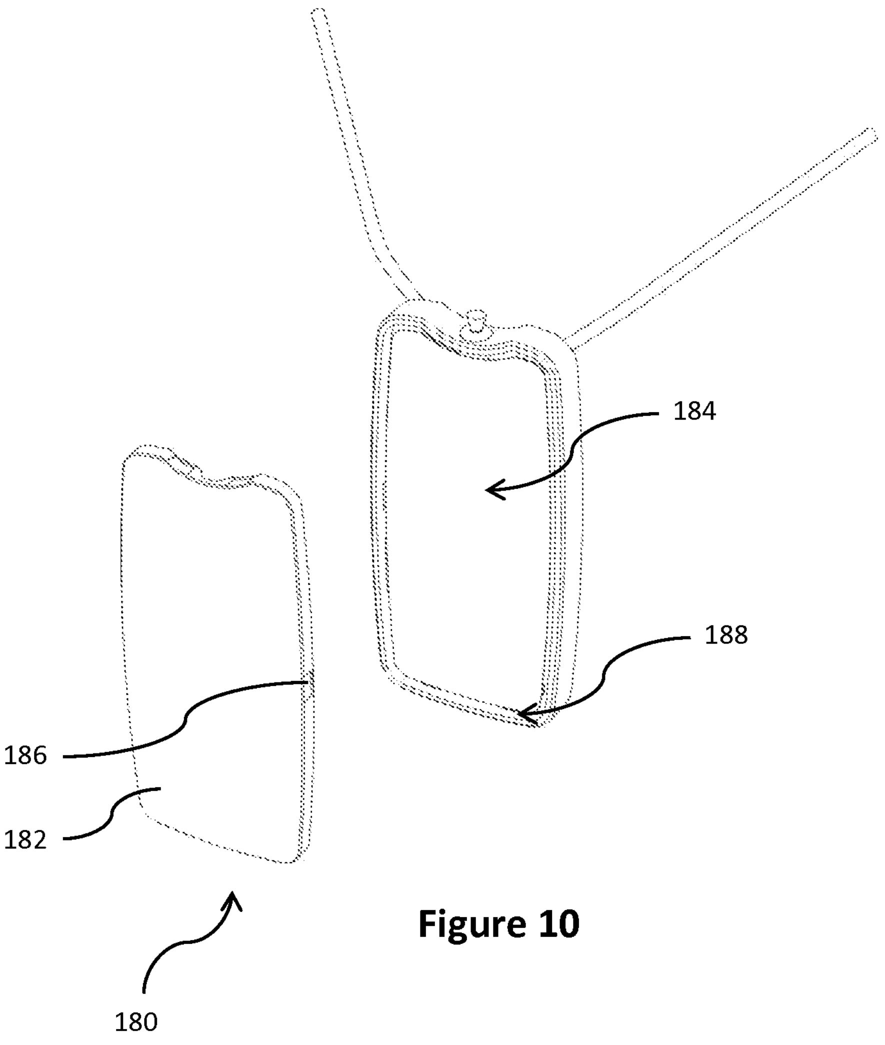
FIG. 10 is a pictorial view of one embodiment of a changeable presentation means for conforming the visible aspect to a desired mood and look of a portable rechargeable personal ionic air purifier in accord with the present invention.

Referring now to FIG. 10, generally designated at 180 is a pictorial view of one embodiment of a changeable presentation means for conforming the visible aspect to a desired mood and look of a portable rechargeable personal ionic air purifier in accord with the present invention. The changeable presentation means of the FIG. 10 embodiment includes interchangeable elements 182 that present to view faces of different preselected color, pattern, texture, or material among other aspects, not shown, that may be selected to suit the desired mood and look of a particular business, casual, pleasure or other use situation. The interchangeable element 182 is received in a front face cutout generally designated 184 and cooperative tongue and groove elements 186, 188 are provided to releasably snap-fit the interchangeable element 182 in the cutout 184 although any other means to provide presentation element interchangeability may be employed. Although the face that an individual interchangeable element 182 presents is planar in the exemplary embodiment, it will be appreciated the interchangeable elements may be otherwise configured.

Any other suitable presentation aspect change means to coordinate the visual aspect presented to suit a desired mood and look may be employed without departing from the inventive concepts.

Among other advantageous aspects, an opening and removable door, both not shown, may be provided over the battery compartment, not shown, to allow battery replacement should it ever exceed its life or be found defective whenever the interchangeable element 182 is removed.

The lanyard suspends and supports the portable rechargeable personal ionic air purifier when it is worn about the neck and it typically is in intimate contact with the body of the user when worn. In intimate contact with their persons the soldered-in-place lanyards of the heretofore known portable air purifiers are subject to the disadvantages among others that they may not look the way they ought, may become soiled and sweaty from wear, and or may itch or otherwise not feel the way they ought.

Figure 11:
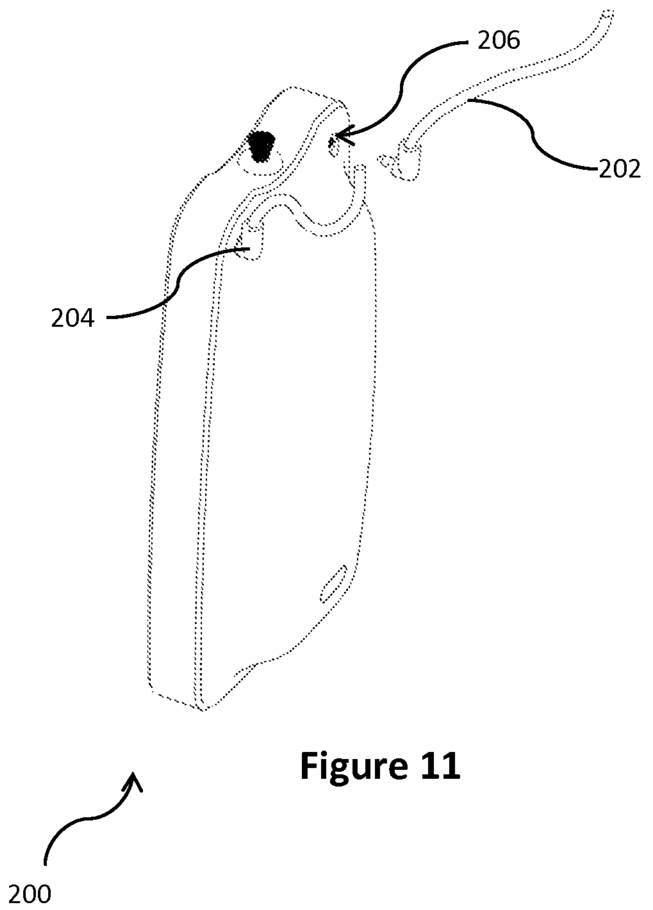
FIG. 11 is a pictorial view of one embodiment of lanyard releasable attachment and electrical connection means to exchange one lanyard for another lanyard of a portable rechargeable personal ionic air purifier in accord with the present invention.

Referring now to FIG. 11, generally designated at 200 is a pictorial view of one embodiment of lanyard releasable attachment and electrical connection means to exchange one lanyard for a different lanyard when soiled, of different length, of another comfort level or for some other reason to change one lanyard for another of a portable rechargeable personal ionic air purifier in accord with the present invention. In the presently preferred embodiment, the lanyard 202 is provided with male plug ends 204 that plug into grounded female plug terminals generally designated 206. Although male plug ends and grounded female plug terminals cooperative to mechanically attach the lanyard releasably to the housing and electrically connect the lanyard to circuit ground are presently preferred, it will be understood that any suitable releasable attachment and electrical connection means may be employed without departing from the inventive concepts.

Many modifications of the present invention will become apparent to those of skill in the art having benefited by the instant disclosure without departing from the inventive concepts.

What is claimed is:

1. A portable battery powered personal ionic air purifier energizing a personal air space with ions and cleaning particulate pollutants therefrom that thereby become entrained thereon that poses little or no personal shock risk and that minimizes battery drain to maximize battery life and useful operating lifetime while maintaining an ion cloud in the personal air space effective to remove particulate pollutants therefrom, comprising:

a portable housing of size and weight adapted to be comfortably worn about the head and neck of any person who wears it;

a conductive grounding neck strap connected to said portable housing that is adapted to support the portable housing about the head and neck and that is adapted to conductively ground the conductive grounding neck strap to the body of any person who wears the portable housing about their head and neck by use of said conductive grounding neck strap;

an ion emitter carried by said portable housing that is adapted to be exposed to the facial area and nose of any person who wears the portable housing about their head and neck and breathes the air in the personal air space about their facial area and nose;

electrical circuitry defining electrical ground and carried by said portable housing including a battery supplying power;

wherein said conductive grounding neck strap is electrically connected to said electrical ground;

wherein said electrical circuitry includes first means powered by said battery for providing a pulse train and second means coupled to said ion emitter and powered by said battery for energizing said ion emitter at ionization potential in response to said pulse train;

wherein said pulse train provided by said first means is a pulse train of predetermined frequency and duty cycle;

wherein said second means for energizing said ion emitter in response to said pulse train is responsive to said pulse train of predetermined duty cycle and frequency to so energize said ion emitter at said ionization potential as to provide emission of ions in ion bursts of controlled burst length and at controlled intervals, with substantially no emission of ions in the interburst intervals therebetween;

wherein said controlled burst length of said emission of ions provided in ion bursts of controlled burst length and at controlled intervals is controlled by said duty cycle of said pulse train;

wherein said controlled intervals of said emission of ions provided in ion bursts of controlled burst length and at controlled intervals are controlled by said frequency of said pulse train;

wherein said predetermined duty cycle of said pulse train is determined to have a comparatively-short "on" time and comparatively-long "off" time in order to minimize if not prevent shock hazard to any person who wears said portable housing about their head and neck, and to minimize battery drain from said battery supplying power, drawing power from said battery supplying power to energize said ion emitter at said ionization potential only during said comparatively-short "on" time while not energizing said ion emitter at said ionization potential during said comparatively-long "off" time, thereby conserving said battery supplying power during said comparatively-long "off" time, while minimizing if not preventing shock risk; and wherein said predetermined pulse frequency of said pulse train providing said emission of ions in ion bursts at said controlled intervals is determined to energize said ion emitter to provide each another burst of ions in time to so refresh the air space with each said another burst of ions as to create said ion cloud effective to remove particulate pollutants in said personal air space and to maintain said ion cloud effective to remove particulate pollutants in the personal air space that otherwise would dissipate over time.

2. The personal ionic air space cleaner of claim 1, wherein said predetermined duty cycle of said pulse train is determined to have an ON pulse of less than fifty (50) ms and wherein said predetermined frequency of said pulse train is determined to have a frequency of at least four-tenths (0.4) Hz.

3. The personal ionic air space cleaner of claim 1, further including means for removably mounting said ion emitter to said portable housing; and wherein said ion emitter is a carbon brush.

4. The personal ionic air space cleaner of claim 1, further including means for mounting said ion emitter to said portable housing including an elongated conductive cord connected to said ion emitter and to said housing in order to allow placement of the ion emitter remote of said portable housing within the length of elongation of said elongated conductive cord.

5. The personal ionic air space cleaner of claim 1, further including a face mask; an elongated conductive cable having ends that at one of its ends is connected to said ion emitter; means for removably mounting said ion emitter to said face mask; and means for removably mounting the other end of said elongated conductive cable to said housing.

6. The personal ionic air space cleaner of claim 1, wherein said pulse train providing means includes a digital timer providing said pulse train of predetermined frequency and duty cycle.

7. The personal ionic air space cleaner of claim 1, further including an ion emitter protection means coupled to the housing for preventing damage to the ion emitter exposed to said facial area and nose when not in use during handling and storage of said portable housing that carries it.

8. The personal ionic air space cleaner of claim 7, wherein said ion emitter protection means includes a cover mounted to said housing movable between closed and open positions that respectively protectively enclose the ion emitter for handling and storage and unprotect and expose the ion emitter for use.

9. The personal ionic air space cleaner of claim 7, wherein said ion emitter protection means includes a retractable slide mounted to said housing movable between closed and open positions that respectively protectively retract the ion emitter within said portable housing for safe handling and storage and unprotect and expose the ion emitter to said facial area and nose for use.

10. The personal ionic air space cleaner of claim 1, wherein said portable housing presents a visible aspect having a particular mood and look and further including changeable presentation means having a different desired mood and look coupled to said housing for conforming the visible aspect of said portable housing to said different desired mood and look.

11. The personal ionic air space cleaner of claim 10, wherein said changeable presentation means includes housing mountable interchangeable elements that present to view faces of selectively different visible aspects each to suit said another different desired mood and look of some particular use situation.

12. The personal ionic air space cleaner of claim 1, wherein said second means includes a DC/AC converter including a transformer and an AC to DC converter connected to the DC to AC converter including a capacitive voltage multiplier network and defining said electrical ground; and further including a means for releasably attaching said conductive grounding neck strap to said housing.

13. The personal ionic air space cleaner of claim 12, wherein said strap includes strap ends; wherein said releasable attachment means includes plug ends carried at said ends of said strap that mate with electrically grounded housing-mounted plug terminals to releasably attach said strap and said housing.

14. The personal ionic air space cleaner of claim 1, wherein said electrical circuitry further includes boost means for temporarily varying ion generation on-demand to adapt to one of exceptionally more polluted or other situations when it is desired to provide temporarily increased removal of particulate pollutants and/or temporarily enhanced ionic energization levels in said personal air space and of (b) exceptionally less polluted or other situations when it is desired to provide temporarily decreased removal of particulate pollutants and/or temporarily reduced ionic energization levels in said personal air space.

15. The personal ionic air space cleaner of claim 14, wherein said boost means includes means to change said duty cycle of said pulse train to vary ion generation on-demand.

16. The personal ionic air space cleaner of claim 14, wherein said boost means includes means to change said frequency of said pulse train to vary ion generation on-demand.

17. The personal ionic air space cleaner of claim 14, wherein said boost means includes means to disconnect the strap from said electrical ground to vary ion generation on-demand.

18. The personal ionic air space cleaner of claim 14, wherein said boost means includes means to change said DC ionization potential to vary ion generation on-demand.

* * * * *